United States Patent
Lin et al.

(10) Patent No.: US 6,731,606 B2
(45) Date of Patent: May 4, 2004

(54) POWER CONTROL OUTER LOOP FOR COMMUNICATION CHANNELS WITH DISCONTINUOUS TRANSMISSION (DTX)

(75) Inventors: Yu-Chuan Lin, Carlsbad, CA (US); Keith W. Saints, San Diego, CA (US); Steven Yoon, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 232 days.

(21) Appl. No.: 10/061,890

(22) Filed: Jan. 31, 2002

(65) Prior Publication Data
US 2003/0142632 A1 Jul. 31, 2003

(51) Int. Cl.[7] .............................. H04L 12/26; H04B 7/00
(52) U.S. Cl. ................ 370/252; 370/311; 370/328; 370/335; 455/69; 455/343; 455/522
(58) Field of Search ................. 370/252, 318, 370/320, 328, 332, 335, 342, 441, 311, 337, 347, 442; 455/38.3, 69, 522, 343, 343.1

(56) References Cited

U.S. PATENT DOCUMENTS

| | | | |
|---|---|---|---|
| 6,373,823 B1 | * | 4/2002 | Chen et al. ............... 370/252 |
| 6,590,874 B1 | * | 7/2003 | Wang et al. .............. 370/318 |
| 2002/0009061 A1 | * | 1/2002 | Willenegger ............. 370/328 |

FOREIGN PATENT DOCUMENTS

| | | |
|---|---|---|
| EP | 1089456 | 9/2000 |
| WO | 0048336 | 8/2000 |
| WO | 00/74289 | * 12/2000 |

* cited by examiner

*Primary Examiner*—Afsar Qureshi
(74) *Attorney, Agent, or Firm*—Philip R. Wadsworth; Charles D. Brown; Timothy F. Loomis

(57) ABSTRACT

Novel techniques are disclosed for adjusting a power control setpoint to compensate for imperfect signal detection in a communication channel capable of discontinuous transmission (DTX). The power control setpoint is compensated for false detections by adjusting the power control setpoint by a dynamically determined setpoint back off amount upon detection of a Good frame. The amount of the setpoint back off is a function of the measured signal quality of the detected Good frame and the number of Erasure indications received immediately preceding the Good frame indication.

31 Claims, 8 Drawing Sheets

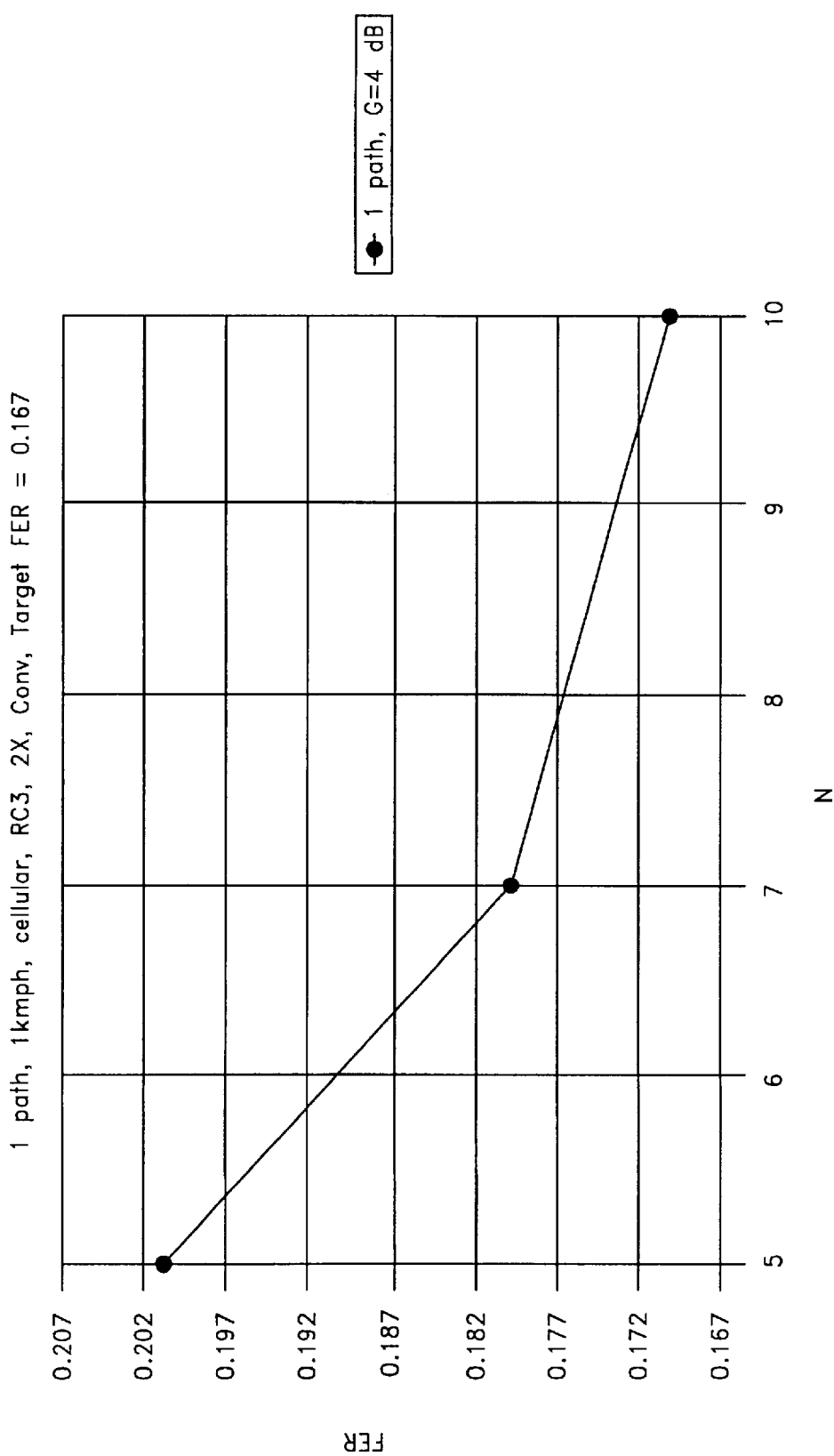
FIG. 4 Effect of N on actual FER

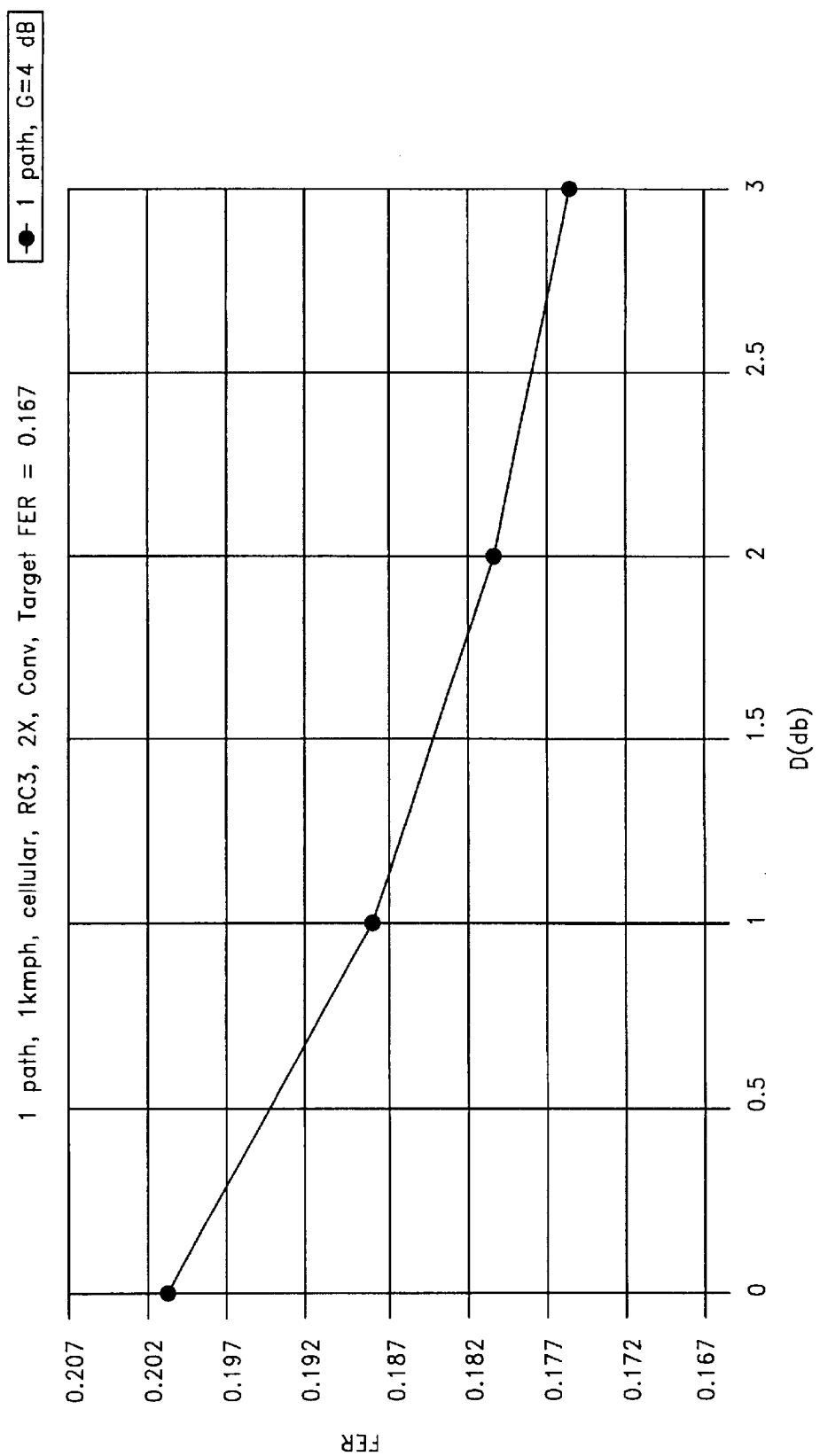
FIG. 5 Effect of D on actual FER

POWER CONTROL OUTER LOOP FOR COMMUNICATION CHANNELS WITH DISCONTINUOUS TRANSMISSION (DTX)

BACKGROUND OF THE INVENTION

1. Field of the Invention

The invention relates to capacity optimization in communication channels. More particularly, the invention relates to optimization of Outer Loop Power Control when the channel is capable of discontinuous transmission (DTX).

2. Description of the Related Art

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems. For example, a CDMA system provides increased system capacity.

A CDMA system may be designed to support one or more CDMA standards such as (1) the Telecommunications Industry Association (TIA)/Electronic Industries Association (EIA) "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Wireless telephone systems are capable of carrying both voice and data over a allocated communication channels. Digital wireless telephone systems are particularly suited to carrying data over the allocated communication channels. It is possible for the system to dedicate a channel to a user, via the user's Mobile Station (MS), in order to accomplish data transmission. A continuously active channel is preferable when the anticipated data transmission is continuous. With a continuously active channel, the user is able to efficiently transmit or receive a continuous data stream over the allocated active channel of the communication system. However, the exploding increase in the number of packet data applications, such as those used when communicating over the Internet, make allocating a continuously active channel to a single user an over allocation of resources. Additionally, because wireless telephone rates are often tied to connection times, a user may not be willing to use a MS to connect to a remote network if a continuous active channel must be dedicated to the connection.

The designers of wireless telephone systems have recognized the desirability of packet data applications over wireless channels. The designers have also recognized that packet data and the associated bursty transmissions may be transmitted over channels that are not continuously active, but rather, allow for discontinuous transmission (DTX).

To maximize channel capacity, a CDMA communication system incorporates power control. Within any cell of a CDMA system all users transmit in the same bandwidth at the same time and each user's transmission contributes to the interference experienced by all other users. The power control process is used to adjust the transmit power to achieve a minimum desired signal quality at the receiver. The interference contribution experienced by other users is minimized because the transmit power to each user is minimized. Because the interference level is minimized, the number of user's that can simultaneously communicate over the channel is maximized.

A closed loop control process is used to control transmission power on both the forward and reverse links in a CDMA system. In closed loop control a transmission is made, a measurement of received power or signal quality is made at the receiver, and feedback is provided to the transmitter.

Closed loop power control is used in the reverse link of a CDMA wireless communication system to ensure the reverse link transmit power is accurately controlled. In reverse closed loop power control, a base station (BS) (or base station controller (BSC)) measures the signal level received from each mobile station (MS) and provides feedback to each MS with instructions to adjust the MS transmit power. The closed loop power control loop attempts to adjust each MS transmit power to cause the reverse link transmit signals from all of the MS in the cell to arrive at the minimum level of power required for each MS to achieve a desired Quality of Service (QoS).

The forward link from the base station (BS) to the mobile station (MS) is no less demanding on a power control loop even though all code channels transmitted from the base station take the same paths to the mobile station. The operation of the forward link power control process is similar to the reverse link process. In forward link power control the MS measures the signal level received from the BS and provides feedback to the BS with instructions to adjust the transmitted power of the code channel associated with that MS. The forward link power control process thus affects the power of the particular MS code channel relative to the other code channels.

In the reverse link process, the base station or base station controller measures the received signal-to-interference ($E_b/I_0$) and compares the measured value to an adjustable threshold known as the power control setpoint. When the measured $E_b/I_0$ is above the setpoint, the base station instructs the MS to reduce the reverse link transmit power by a predetermined amount, e.g., 1 dB. When the measured $E_b/I_0$ is below the threshold, the BS sends the MS a command to increase the reverse link transmit power by a fixed amount.

The forward link process may operate in a complementary manner. The MS measures a received signal-to-interference ($E_b/N_t$) and compares the measured value to an adjustable power control setpoint within the MS used for the forward link signals. The forward link uses the interference measurement $N_t$ rather than the $I_0$ value used in the reverse link. When the measured $E_b/N_t$ is above the setpoint, the MS instructs the BS to reduce the forward link transmit power in the assigned code channel by a predetermined amount, typically fractions of a dB. When the measured $E_b/N_t$ is below the threshold, the MS sends the BS a command to increase the forward link transmit power in the assigned code channel by a fixed amount.

The values of the respective forward link and reverse link power control setpoints, either at the MS or the BS, largely determine the QoS maintained at the receiver. The QoS is often measured as a Frame Erasure Rate (FER), alternatively known as a Frame Error Rate. As expected, increasing the value of the power control setpoint reduces the FER, thereby providing a higher QoS. Reducing the power control setpoint increases the FER. Adjusting the threshold of the power control setpoint occurs in a process known as Outer Loop Power Control (OLPC). In the forward link the process is known as Forward Outer Loop Power Control (FOLPC) and in the reverse link the process is known as Reverse Outer Loop Power Control (ROLPC). The forward link power control setpoint and the reverse link power control setpoint are independently controlled. There may or may not be any correspondence between the setpoint values used in the forward and reverse links because of the differences in signaling schemes and receiver structures used in the forward and reverse links. The similarity in nomenclature refers to the similarity in function, not to a commonality of value or control.

The receiver incorporates a DTX detection algorithm when the channel is DTX capable. Imperfect determinations of DTX and non-DTX frames result in a power control setpoint threshold that is sub-optimal. A setpoint that is too high results in reduced channel capacity. It is desirable during OLPC to adjust the power control setpoint to compensate for inaccurate DTX and non-DTX indications and thus optimize the power control setpoint and the channel capacity.

SUMMARY

Novel techniques are disclosed for outer loop power control for communication over a channel employing DTX. Power control setpoint is adjusted to compensate for imperfect signal detection in a communication channel capable of DTX. The power control setpoint is compensated by estimating a number of erroneous detections and determining a compensation value based in part on the estimate. The power control setpoint is compensated for false Erasure detections by adjusting the power control setpoint by a dynamically determined setpoint back off amount upon detection of a Good frame. The amount of the setpoint back off is a function of the measured signal quality of the detected Good frame and a number of Erasure detections received immediately preceding the Good frame indication. The number of Erasure detections is reset when a Good frame is detected.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein:

FIG. 4 is a graph of FER vs. threshold number N.

FIG. 5 is a graph of FER vs. margin value D.

DETAILED DESCRIPTION OF EMBODIMENTS

Figure 1:
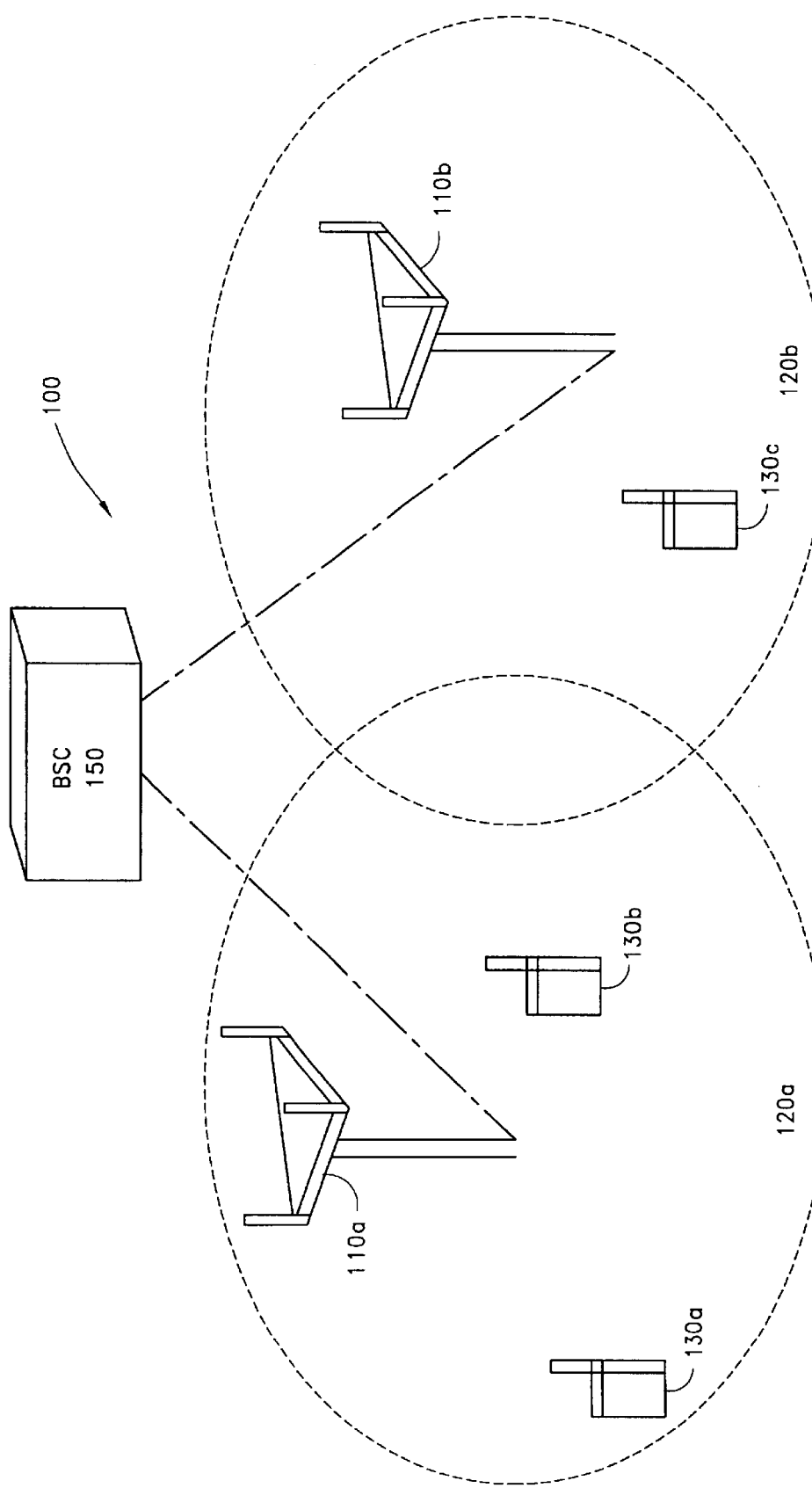
FIG. 1 is a diagram illustrating a wireless communication system implementing power control setpoint optimization.

The CDMA 2000 standard provides nine radio configurations for the Forward Traffic Channel. The signals that may be transmitted on the Forward Traffic Channel are defined to include a Forward Dedicated Control Channel (F-DCCH), a Forward Fundamental Channel (F-FCH), a Forward Power Control Subchannel, Forward Supplemental Code Channels (F-SCCH), and Forward Supplemental Channels (F-SCH). Any one of the nine defined radio configurations may have all or a subset of all of the defined channels within the Forward Traffic Channel. The F-DCCH and F-SCH may be capable of discontinuous transmission. In the case of the F-DCCH, the decision to enable or disable transmission is made on a frame by frame basis.

The CDMA 2000 standard also provides for six different radio configurations for the Reverse Traffic Channel. The signals that may be transmitted on the Reverse Traffic Channel are defined to include a Reverse Dedicated Control Channel, a Reverse Fundamental Channel, a Reverse Supplemental Channel, and a Reverse Supplemental Code Channel. Only some of the channels will be present in any particular radio configuration. The CDMA 2000 standard allows an operating mode (referred to as P2 mode) in which the Reverse Dedicated Control Channel (R-DCCH) is used together with the Reverse Supplemental Channel (R-SCH) without the transmission of a Reverse Fundamental Channel (R-FCH).

Furthermore, the CDMA 2000 standard allows both R-DCCH and R-SCH to support DTX. Both channels independently have the possibility of a DTX occurrence due to a frame not having been transmitted by a Mobile Station (MS). This occurs when the MS has no data to be transmitted or, in case of the R-SCH, when the MS does not have enough available power to transmit the R-SCH.

In both the forward link and reverse link channels capable of DTX, the decision to transmit or not transmit a frame is determined at the transmitter. The receiver has no prior knowledge of when DTX will occur. Because of the receiver's lack of knowledge as to the transmitter's decision to transmit DTX, some type of DTX detection occurs at the receiver to determine the presence of DTX. DTX detection may be implemented directly in the MS when the DTX transmission occurs on the forward link. Alternatively, DTX detection may occur in a signal processing stage coupled to an output of the MS, and in general may be implemented in any signal processing stage following the MS radio frequency (RF) receiver. Conversely, DTX detection may be implemented in the Base Station, Base Station Controller, or in any signal processing stage following receipt of the reverse link transmission when the DTX signals occur on the reverse link.

The DTX detection algorithm may provide one of the following possible outcomes for every received frame:

Good frame—the algorithm indicates a frame was transmitted and the successfully decoded frame does not contain bit errors.

Erasure—the algorithm indicates a frame was transmitted but the decoded frame contains bit errors.

DTX—the algorithm indicates no frame was transmitted.

In a typical OLPC algorithm the power control setpoint is increased by a predetermined UP step size upon receipt of an Erasure indication from the DTX detection algorithm. The power control setpoint is decreased by a predetermined DOWN step size upon receipt of a Good frame indication from the DTX detection algorithm and the power control setpoint is left unchanged upon receipt of a DTX indication from the DTX detection algorithm.

The UP and DOWN step sizes are chosen so as to promote the convergence of the power control loop to a desired or specified target Frame Erasure Rate (FER). A typical desired FER may be in the range of 1–5%. An example of an implementation to target an average FER of 1% has an UP step size of 0.3314 dB and a DOWN step size of 0.003348 dB. One will recognize that the UP and DOWN step sizes need not be equal in size and that a larger step size will allow for faster loop convergence. A larger step size may result in a potentially higher average FER upon loop convergence, however, the effects may be reduced by adjusting the ratio of the UP and DOWN step sizes.

Various problems may occur for channels having DTX because of non-ideal performance of the DTX detection algorithm. For example, inaccurate DTX detections may cause the outer loop to converge to a higher FER when the signal is transmitted in discontinuous mode. The higher FER convergence occurs because not all the Erasure events are reported by the DTX detection algorithm. Because some Erasure events are incorrectly reported as DTX, the power control setpoint is lower than necessary to achieve the desired Quality of Service for that channel and the result is a negative effect on data throughput.

Because some DTX events are incorrectly classified as Erasure events, the power control setpoint may be inaccurately set to higher than it should be. An erroneously high setpoint has a negative effect on the channel capacity because a higher than necessary power level is requested from the transmitter and the transmitted signal on any one code channel appears as interference to all other code channels.

An OLPC algorithm that compensates for imperfect DTX detections may be implemented at the receiver in order to optimize the performance of the communication link. One embodiment of an implementation of power control setpoint optimization within a wireless communication system is shown in FIG. 1. A communication system 100 is shown as a wireless communication system, such as a CDMA wireless phone system. The communication system 100 has one or more base stations, 110a and 110b, here shown as antenna systems typical of a wireless phone system. Although only two base stations 110a, 110b are shown, it is understood that the communication system 100 may support any number of base stations. Each base station 110a, 110b provides coverage for a corresponding cell 120a, 120b. The coverage areas or cells 120a, 120b supported by the two base stations 110a, 110b are shown to be overlapping. However, it is understood that where more than one base station is supported in the communication system 100, the cells supported by each base station may or may not overlap. Additionally, the cells of any three or more base stations may have some common coverage areas or may be mutually exclusive.

Since the operation of the communication system 100 within each cell is substantially identical, the discussion will focus on the operation within a single cell. A base station 110a supports coverage over a corresponding cell 120a. There may be one or more Mobile Stations (MS) 130a, 130b, within the cell 120a simultaneously communicating with the base station 110a. The MS 130a, 130b are shown as portable phones but it is understood that the MS 130a, 130b may be portable phones, mobile phones operating within vehicles, fixed position phones, wireless local loop phones, or any other communication device. The base station 110a communicates to each MS 130a, 130b, over a forward link channel and each MS 130a, 130b communicates to the base station 110a over a reverse link channel. The communication links may be over a continuously active channel or may allow for DTX. The base station 110a also communicates with a Base Station Controller (BSC) 150 that provides the communication link to a Public Switched Telephone Network (PSTN) not shown. Power control is used on the forward link as well as on the reverse link, but the respective power control loops operate independently of each other. Closed loop power control converges the communication link to the minimum transmitted power required to achieve a desired Quality of Service (QoS).

The operation of Outer Loop Power Control (OLPC) in the forward link is similar to that in the reverse link. The following discussion will concentrate on the operation of OLPC in the forward link but it is understood that the concepts may also be used in the reverse link because of the similarities in the operation of the respective OLPC algorithms. Additionally, the OLPC algorithm functions similarly with respect to all MS within a coverage area although the description only describes the function of a single MS.

In the forward link, the signal received at the MS 130a is measured against a power control setpoint as part of the power control loop. The power control setpoint typically represents a Signal to Noise Ratio (SNR) value that may be obtained from the received forward link signal. As an example, the power control setpoint may be compared to a measured energy per bit to noise power ratio ($E_b/N_t$). It may be convenient to use the $E_b/N_t$ value because a receiver may be able to determine the value quickly, thus allowing for faster power control loop performance. The power control setpoint corresponds to a level of QoS measured as FER. Alternatively, a particular FER value itself may be used for a power control setpoint but since the FER is determined at a rate that is slower than $E_b/N_t$, the power control loop performance would need to be correspondingly slower. The setpoint comparison and FER measurement may be implemented in the MS 130a or may be implemented in a signal processing stage (not shown) following the MS 130a.

The OLPC algorithm compensates for imperfect DTX detections by estimating a number of incorrectly determined frames and modifying the setpoint value to correct for the incorrectly determined frames. It is extremely unlikely that a DTX detection algorithm will provide a false Good frame indication. Therefore, the estimate of incorrectly determined frames likely is directed towards estimating a number of incorrectly determined Erasure or DTX frames.

In one embodiment the algorithm estimates a number of incorrectly determined Erasure frames and decreases the power control setpoint by a setpoint backoff value. The setpoint backoff value may be a constant or may be dynamically determined. The setpoint backoff value may be a function of a signal metric that is measured at the time the backoff value is dynamically determined. The measured signal metric may be the $E_b/N_t$ of a Good frame. It may be convenient to use the arrival of a Good frame as the trigger to compensate the setpoint because the $E_b/N_t$ of the most recently received Good frame is likely a good estimate of the average $E_b/N_t$ for received frames over a short time duration. Additionally, the $E_b$/Nt may already be measured as part of the power control process. Thus, the use of $E_b/N_t$ may not generate a greater processing burden on the receiver.

The upper bound of the erroneous Erasure detections is the total number of Erasure detections. When a Good frame detection is used as the trigger to compensate the power control setpoint, the upper bound of erroneous Erasure detections is the number of Erasure detections that occur between consecutive Good frame detections. Of course, not all detected Erasures will be erroneous Erasure detections. Therefore, the setpoint backoff amount may be a function of the number of Erasure detections that occur between successive Good frame detections.

Figure 2:
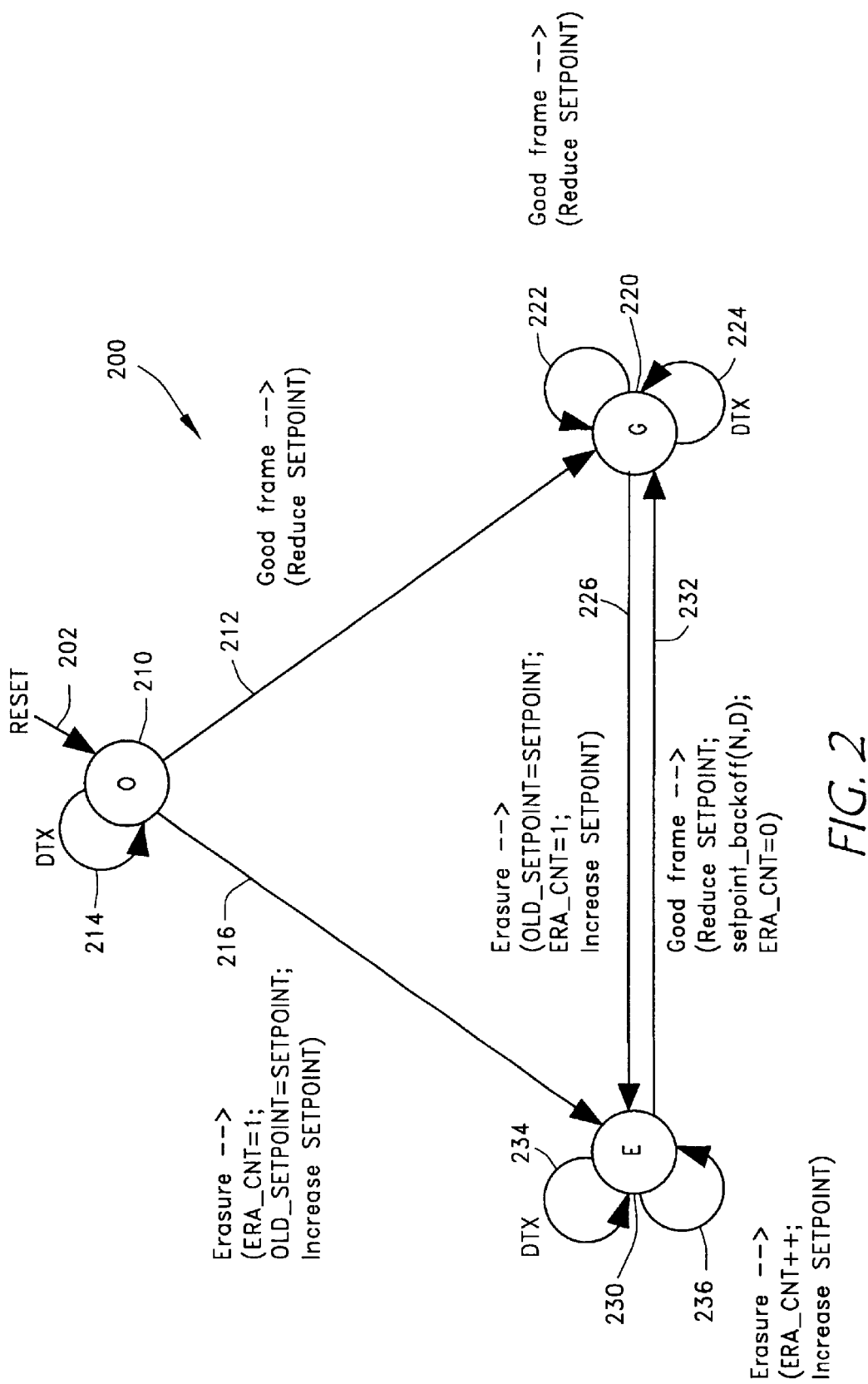
FIG. 2 is a state diagram of power control setpoint optimization for imperfect DTX detection.

A detailed state diagram of the setpoint compensation algorithm 200 for OLPC is shown in FIG. 2. The state machine 200 is reset and entered 202 upon an initialization event. The initialization event may be when the MS is first turned on, upon registration of the MS in a coverage area, upon initialization of a traffic channel, upon initialization of communication over a DTX enabled channel, upon initialization of DTX communication, or upon any other initialization event.

Following reset and initialization 202 the state machine enters State 0 210 where it awaits detection of the next received frame. It is convenient to update the state machine 200 following each frame because the DTX decision may be made on a frame by frame basis. If the DTX algorithm determines that the next received frame is a DTX frame 214 the state machine remains in State 0 210 and awaits detection of the next received frame. If the DTX algorithm detects a Good frame 212 the state machine advances to State G 220 and reduces the setpoint by a predetermined downward amount. The predetermined downward amount may be the predetermined DOWN step size as discussed above.

While in State G 220, the state machine 200 awaits the next frame. If the next frame is detected as a DTX 224 the state machine 200 remains in State G 220. Similarly, if the next frame is detected as a Good frame 222 the state machine 200 remains in State G 220. The setpoint is also decreased by a predetermined downward step size upon detection of a Good frame 222 while in State G 220. However, if the next frame is detected as an Erasure 226 the state machine 200 advances to State E 230. The Erasure detection 226 causes the state machine 200 to save the current setpoint value as a historical setpoint value, here given the name Old_Setpoint. An Erasure count is also initialized to one and the setpoint value is increased by a predetermined upward amount. The predetermined upward amount that the setpoint is increased may be the predetermined UP step size as previously discussed.

Returning to State 0 210, an Erasure detection 216 will also advance the state machine to State E 230. An Erasure detection 216 while in State 0 210 also causes the state machine 200 to save the current setpoint as a historical setpoint value, initialize an Erasure count to one, and increase the setpoint by a predetermined amount.

While in State E 230, the state machine counts the number of Erasure detections in order to estimate a number of erroneous detections from which a setpoint compensation value may be derived. The state machine 200 remains in State E 230 if a DTX detection 234 occurs while in the state. If an Erasure detection 236 occurs while in State E 230 the state machine 200 increments the Erasure count and increases the setpoint by the predetermined upward amount. If a Good frame detection 232 occurs while in State E 230 the state machine returns to State G 220. The Good frame detection 232 is also used as the triggering event to compensate the power control setpoint for potentially erroneous frame detections. The state machine reduces the setpoint value by the predetermined downward amount and the Erasure count is reset to zero. The Erasure count is reset to zero because the setpoint compensation takes into account all Erasure detections that have occurred since the previous Good frame detection (or since initialization of the state machine 200, whichever occurred most recently in time). The state machine 200 then makes the setpoint backoff determination to evaluate the amount, if any, that the setpoint should be further reduced to compensate for estimated erroneous Erasure detections. The setpoint backoff may be a constant value or may be dynamically determined. A dynamic setpoint backoff determination algorithm flow chart is shown in detail in FIG. 3D and is described below.

Figure 3A:
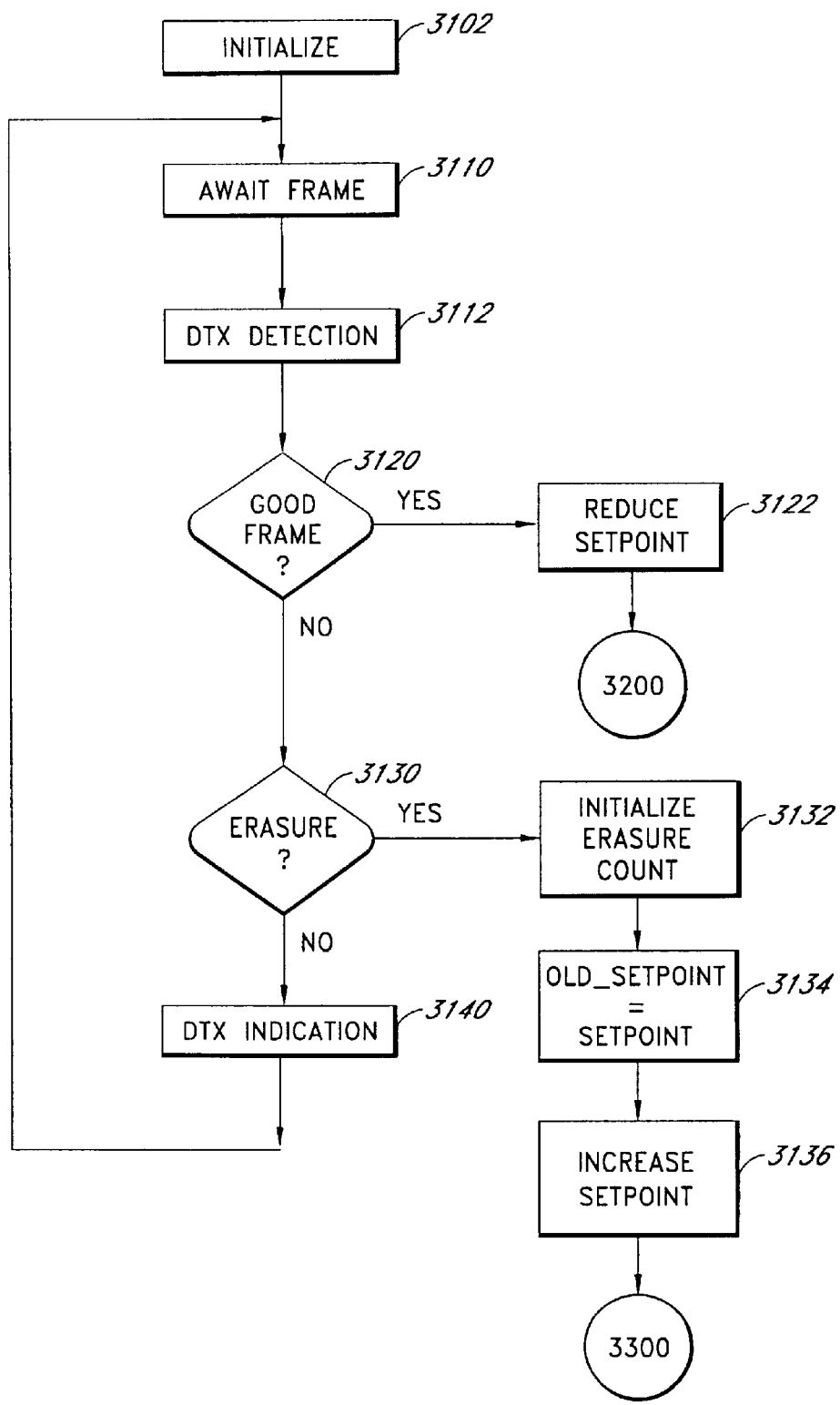
FIGS. 3A–3D are flow diagrams showing the function of an outer loop power control algorithm.

FIGS. 3A–3D illustrate a flow chart representation for an OLPC algorithm that compensates for imperfect DTX detections. Referring to FIG. 3A, the algorithm begins by entering initialization block 3102. Any number of events may be used as the triggering event for entry into the algorithm, as discussed above with respect to the state diagram. After initialization, the algorithm proceeds to block 3110 where it awaits the arrival of the next data frame. It is convenient to update the algorithm on a frame by frame basis when the decision to transmit DTX signals is made on a frame by frame basis. However, if the decision to transmit DTX is not made on a frame basis, if reduced computation complexity is required, if an accurate estimate of DTX detection errors can be made at another rate, or if other reasons exist, the algorithm may update on a basis that is less frequent than the frame rate. Similarly, factors may make updating of the algorithm at a rate higher than the frame rate a desirable feature.

Once a frame arrives at the receiver, the algorithm proceeds to block 3112 where DTX detection is performed. As discussed above, a DTX detection algorithm typically returns one of three indications for the examined frame. The DTX detection algorithm represented by block 3112 will typically return an indication of a Good frame, an Erasure, or a DTX. DTX detection may be based on the contents of the frame or may be based on a combination of factors including the received signal strength and received signal SNR. The frame may include signal quality indicators such as parity bits or Cyclic Redundancy Check (CRC) bits that allow DTX detection to verify a Good frame or the existence of bit errors within the frame. Differentiating between an Erasure and a DTX may depend on the received SNR or some other measure of signal quality.

Following DTX detection in block 3112, the algorithm proceeds to block 3120 to check to see if the DTX detection algorithm determined that a Good frame was transmitted. The algorithm advances to block 3122 if a Good frame was detected. In block 3122 the power control setpoint is reduced by a predetermined downward amount. This reduction in the power control setpoint is typically a reduction by a fixed predetermined amount. Alternatively, the setpoint may be reduced by a dynamic amount, for example, an amount relative to the received $E_b/N_t$. The flow chart proceeds from block 3122 to point 3200 that connects the flow chart of FIG. 3A with the flow chart of FIG. 3B. Point 3200 is not a functional element but, rather, is a point to show the interconnection of the several flow charts.

Returning to block 3120, if the DTX detection algorithm did not produce a Good frame indication, the flow chart advances to block 3130 to check to see if an Erasure was detected. If in block 3130 an Erasure detection was determined to be the output of the DTX detection algorithm, the flow chart proceeds to block 3132.

The OLPC algorithm begins the process of estimating a number of erroneous DTX detections by counting the number of Erasure detections that occur. In block 3132, the algorithm initializes the Erasure Count to one. The algorithm next proceeds to block 3134 where the current setpoint value is saved as a historical setpoint value denoted as Old_Setpoint. The flow chart next proceeds to block 3136 where the power control setpoint is increased by a predetermined upward amount. The power control setpoint is typically increased by a predetermined fixed value, although a dynamic value may be used. Once the power control setpoint is increased in block 3136, the flow chart proceeds to point 3300 that is used to connect the flow chart of FIG. 3A to the flow chart of FIG. 3C.

Returning to block 3130, if an Erasure detection has not occurred, the flow chart proceeds to block 3140. In block 3140 the algorithm determines that a DTX detection occurred. Previous blocks have already determined that the received frame was not detected as a Good frame or an Erasure. Therefore, the DTX detection algorithm likely detected a DTX frame and thus there is no reason to verify this in a decision block. A decision block may be desirable if the DTX detection algorithm has the ability to determine greater than three frame types. Once the flow chart determines in block 3140 that a DTX frame was received, the algorithm returns to block 3110 to await the arrival of the next frame.

Figure 3B:
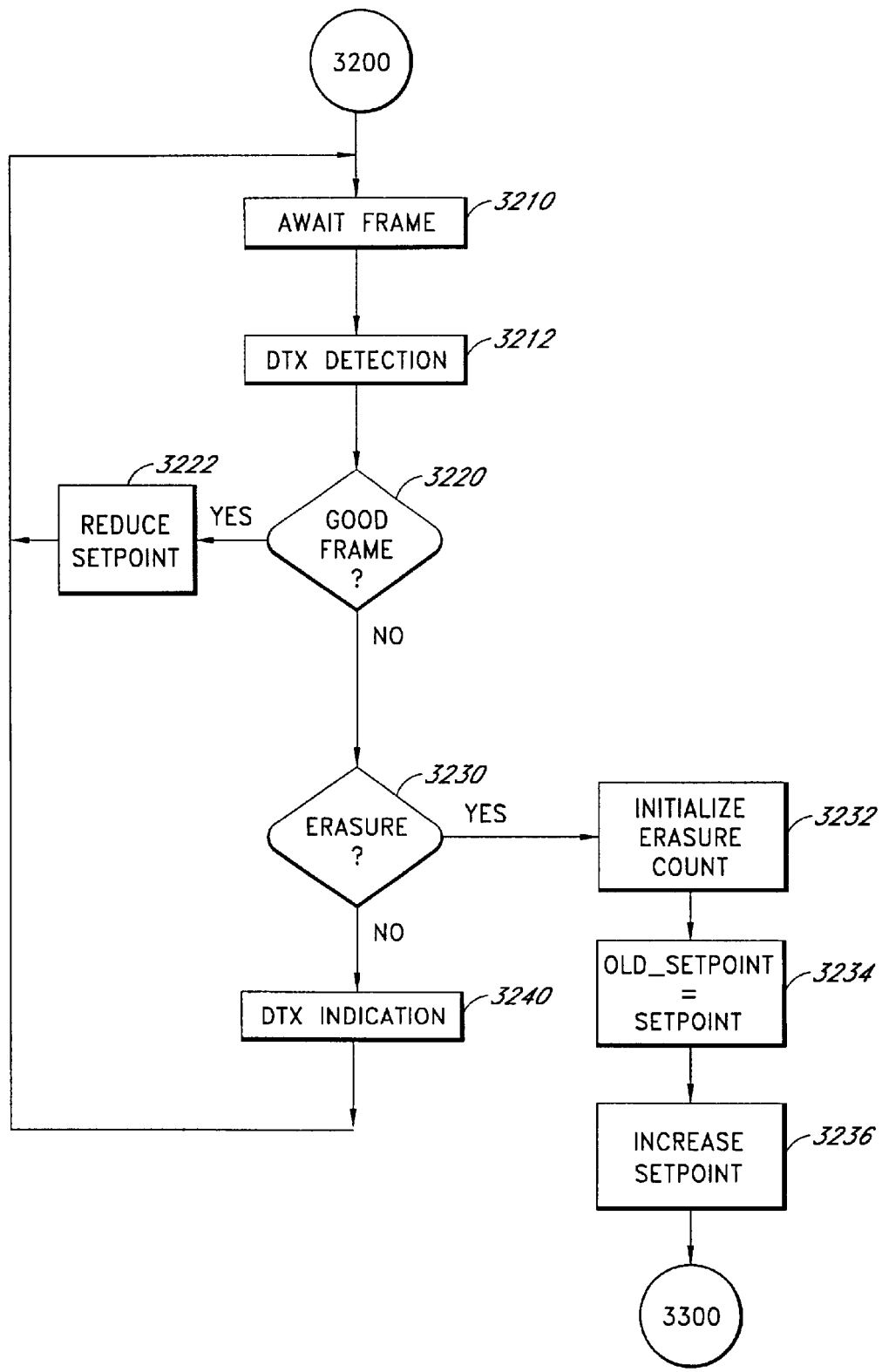
Figure 3C:
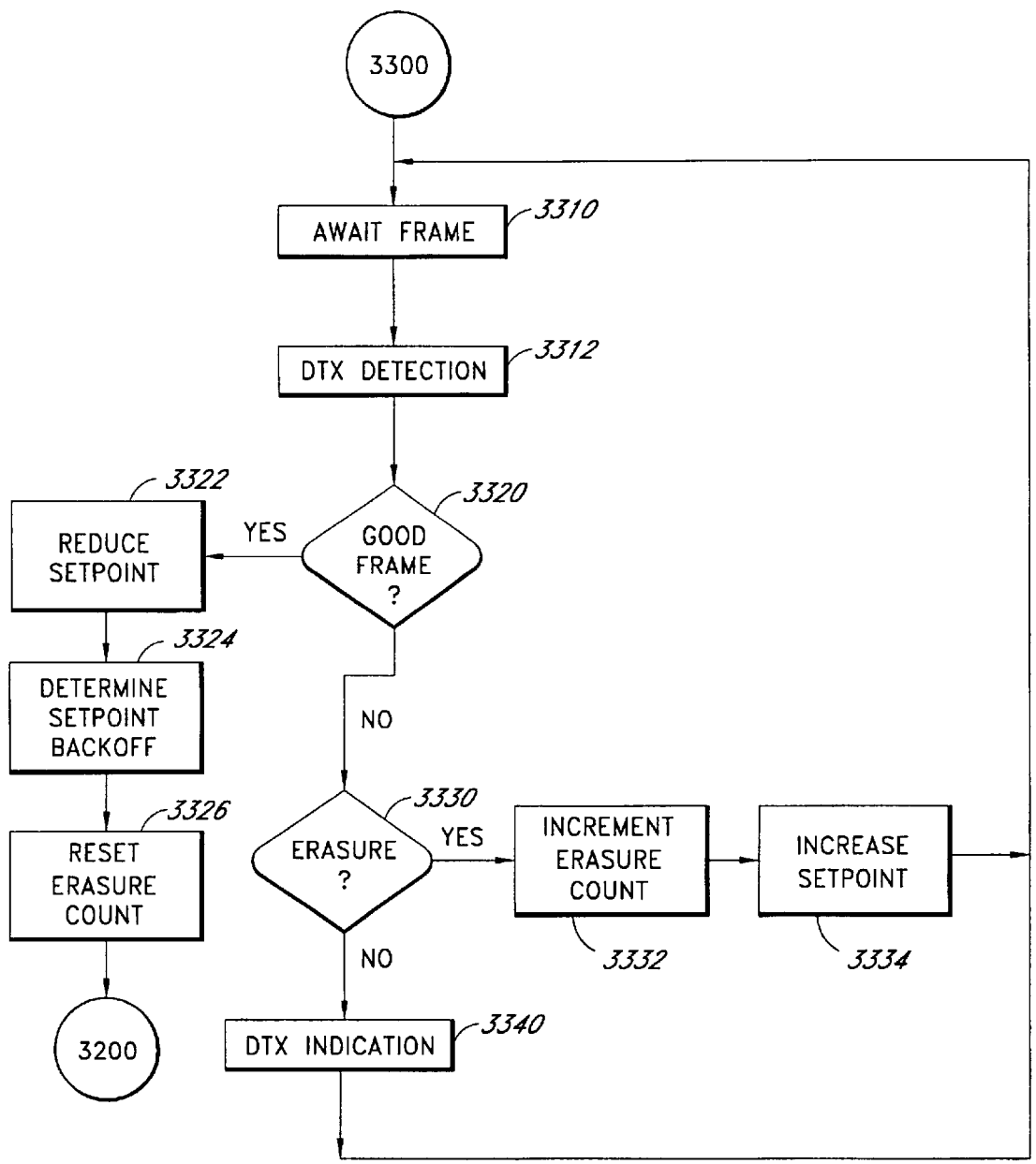

Referring to FIG. 3B, this flow chart may be reached from either the flow charts of FIG. 3A or FIG. 3C following a Good frame indication. Point 3200 represents the entry into this portion of the OLPC algorithm. The algorithm in block 3210 awaits the arrival of the next frame. Following the arrival of the frame, the algorithm proceeds to the DTX detection algorithm of block 3212 where the received frame is characterized as a Good frame, Erasure, or DTX. Once the DTX detection algorithm is complete, the flow chart proceeds to block 3220 to check to see if the DTX detection algorithm determined that a Good frame was received. If the DTX detection algorithm indicates a Good frame, the algorithm proceeds to block 3222 where the setpoint is reduced by the predetermined downward step size. The OLPC algorithm then returns to block 3210 to await the next frame. However, if a Good frame has not been detected, the algorithm advances to block 3230 where the algorithm checks to see if the DTX detection algorithm of block 3212 indicated an Erasure. If no Erasure is indicated, the algorithm proceeds to block 3240 where it is determined that the DTX detection algorithm of block 3212 indicates the remaining frame type, DTX. The algorithm then returns to block 3210 to await the next frame.

Returning to block 3230, if the algorithm determines that an Erasure is indicated, the flow chart proceeds to block 3232 to begin counting the Erasure indications. In block 3232 the Erasure count is initialized to a value of one. Next, in block 3234, the algorithm saves the setpoint value as a historical setpoint value, Old_Setpoint. The flow chart then proceeds to block 3236 where the setpoint is increased by the predetermined upward step size value. The flow chart then proceeds to point 3300 that represents the linking point to the flow chart shown in FIG. 3C.

Referring to FIG. 3C, entry point 3300 may be reached from either flow charts of FIG. 3A or FIG. 3B following Erasure indications. Upon entry from point 3300 to the flow chart shown in FIG. 3C, the algorithm proceeds to block 3310 to await the arrival of the next frame. After arrival of the next frame the algorithm proceeds to block 3312 where the DTX detection algorithm is performed.

Following completion of the DTX detection algorithm, the flow chart proceeds to block 3320 to determine whether or not a Good frame is indicated. If a Good frame is not indicated, the flow chart proceeds to block 3330 to check to see if the DTX detection algorithm of block 3312 indicates an Erasure. If an Erasure is not indicated, the routine proceeds to block 3340 where it is determined that DTX is indicated. Following block 3340 the flow chart returns to block 3310 to await the next frame.

Returning to block 3330, if the DTX detection algorithm does indicate an Erasure, the flow chart proceeds to block 3332 where the value in the Erasure count is incremented by one. The flow chart then proceeds to block 3334 and the power control setpoint is increased by the predetermined upward step size. The flow chart then returns to block 3310 to await the arrival of the next frame.

Returning to block 3320 where the algorithm checks for a Good frame indication, if the algorithm determines that the DTX detection algorithm of block 3312 indicates a Good frame, the flow chart proceeds to block 3322 where the power control setpoint is decreased by the predetermined downward step size. The flow chart next proceeds to block 3324 where a setpoint backoff value is determined and applied to the power control setpoint. In one embodiment the setpoint backoff value is a predetermined backoff constant value while in another embodiment the setpoint backoff value is dynamically determined by an algorithm such as the one shown in FIG. 3D. Once the setpoint backoff value is determined and applied, the flow chart proceeds to block 3326 where the Erasure count is reset to zero. The Erasure count may be reset to zero because the application of the setpoint backoff value in block 3324 compensates the power control setpoint for all accumulated erroneous Erasure indications. The flow chart then proceeds to point 3200 that links the flow chart of FIG. 3C to the flow chart of FIG. 3B.

Figure 3D:
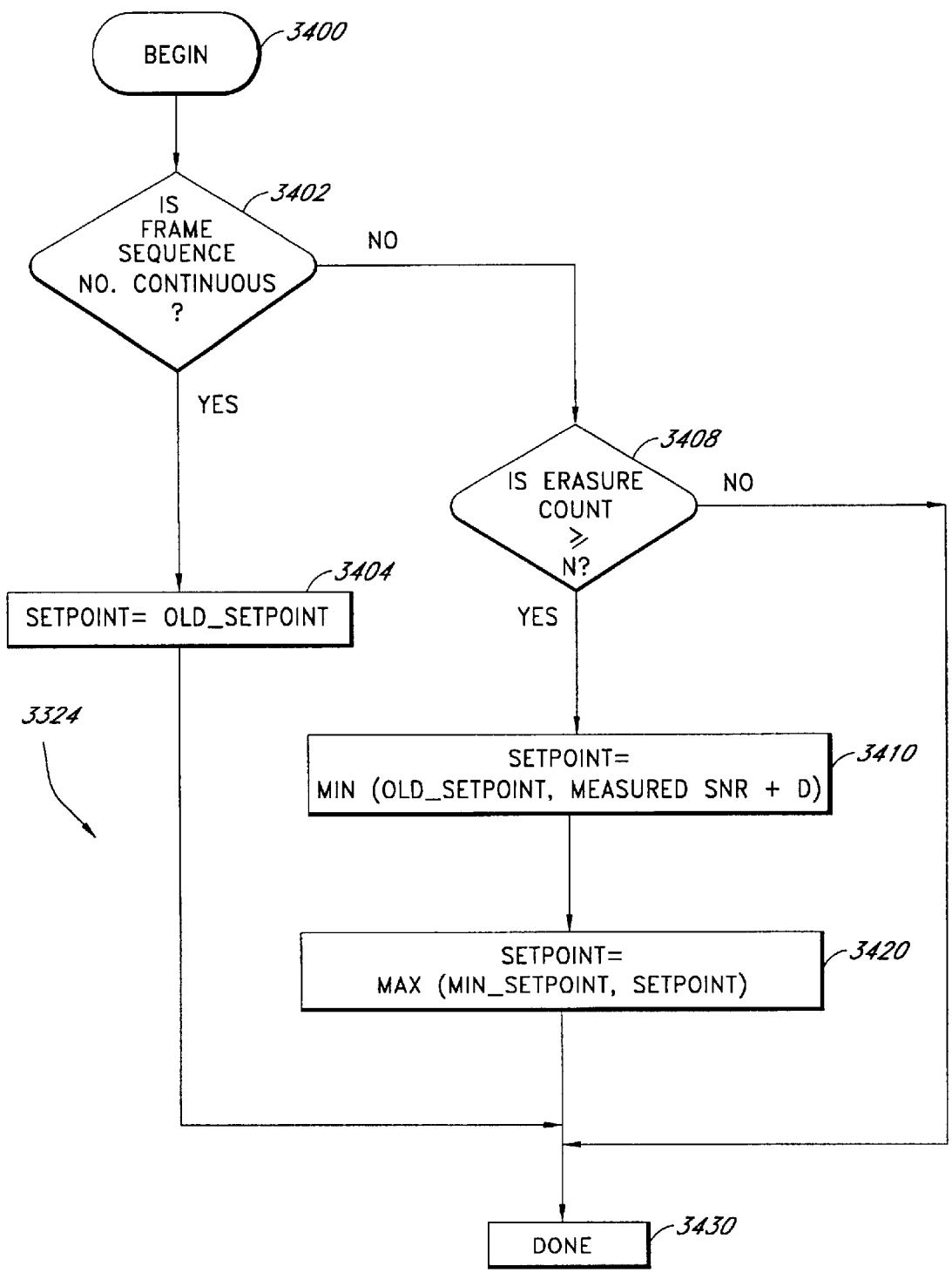

Block 3324, shown in FIG. 3C as the block where the setpoint backoff is determined and applied, is shown in detail in FIG. 3D. The setpoint backoff algorithm is entered at block 3400. The flow chart first proceeds to block 3402 where it checks to see if a frame sequence number of the received Good frame is continuous with a prior frame sequence number from a previously received Good frame. The frame sequence number is defined in an upper layer of the CDMA 2000 standard and is an indicator of an order of the transmitted frames. If the frame sequence number is continuous, the flow chart proceeds to block 3404 where the setpoint is set to the value of the historic setpoint value, Old_Setpoint. A continuous frame sequence number indicates that, no matter what the Erasure count value, no frames have been lost between the last two Good frame indications. Thus, block 3404 resets the setpoint value to the historic value that it was equal to just after the previous Good frame indication. From block 3404, the flow chart proceeds to block 3430 where it is done.

Returning to block 3402, if the frame sequence number is not continuous, an actual Erasure occurred since the last Good frame. The flow chart next proceeds to decision block 3408 where the Erasure count is compared against a predetermined constant, N. The predetermined constant N represents a threshold number of Erasure detections that must occur between successive Good frame detections before the power control setpoint will be compensated by the setpoint backoff algorithm. The value chosen for N varies depending on the design of the receiver and the implementation of the DTX detection algorithm. It may be preferable to choose a higher number for N when the confidence in the output of the DTX detection algorithm is high. Similarly, if the output of the DTX detection algorithm is unreliable, a lower number for N may be preferable. The number chosen for N may be roughly inversely proportional to the probability of false detection by the DTX detection algorithm. The number for N may be derived empirically by varying N and examining the actual FER under various operating conditions when the statistics of the DTX detection algorithm are not known or are not estimated to a desired degree of confidence.

If the Erasure count does not exceed the threshold number N, the flow chart proceeds to block 3430 and is done. In this circumstance, it is not likely that an erroneous Erasure detection occurred if the Erasure count has not exceeded the threshold number. Therefore, the number of erroneous detections is estimated to be zero and the power control setpoint is not compensated.

Returning to decision block 3408, if the Erasure count does exceed the threshold number, N, then it is likely that there were erroneous Erasure detections. The flow chart proceeds to block 3410 to make an estimate of a compensated power control setpoint. In block 3410 the algorithm sets the power control setpoint to the minimum of the historical setpoint and a measured SNR of the received Good frame plus a predetermined margin, D. That is, the algorithm sets the setpoint to be equal to min(Old_Setpoint, measured SNR+D), where the Old_Setpoint, measured SNR, and predetermined margin, D, are all values expressed in dB. It may be convenient to use the $E_b/N_t$ value measured for the Good frame as the measured SNR value.

The predetermined margin D represents a margin above the measured SNR. The algorithm adds the margin to the measured SNR and compares the sum to the historical setpoint. D may be a predetermined constant or may be dynamically determined. Where D is dynamically determined, the value may be adjusted according to the quality of the received frame. A metric to use for the quality of the received frame may be a Symbol Error Rate count. As an example, the predetermined margin D may be reduced if the number of error symbols exceeds a threshold. Similarly, the predetermined margin, D, may be increased if the number of symbol errors is higher than a threshold. Regardless of the determination of the predetermined margin, D, the value of the setpoint is compensated to the minimum of Old_Setpoint and the SNR+D value.

The flow chart next proceeds to block 3420 to determine if the setpoint needs to be reset to a minimum setpoint value. Block 3420 is optional and a designer may choose to exclude it without much detrimental effect on the performance of the OLPC algorithm. The minimum setpoint value, Min_Setpoint, represents a minimum predetermined setpoint value over which reliable communications will occur. In block 3420 the algorithm sets the setpoint to max(Min_Setpoint, setpoint), where Min_Setpoint represents the value in dB of a predetermined minimum setpoint value. The algorithm proceeds to block 3430 and is done once the setpoint is compared to the minimum setpoint value and adjusted if required.

Therefore, it can be seen from an examination of the flowcharts of FIGS. 3A–3D that the OLPC algorithm counts a number of Erasure indications to determine an estimate of a number of erroneous frame detections. Then a setpoint backoff value is determined based in part on the number of Erasure detections and applied to the power control setpoint when a Good frame is detected. A counter used to track the number of Erasure detections is reset to zero following each compensation of the power control setpoint.

FIG. 4 shows a graph of FER for varying values of the threshold number, N. The OLPC algorithm is implemented in a MS to provide Forward OLPC and represents data for a radio operating in a cellular frequency band, having a single path, velocity of 1 km/h, configured for radio configuration 3 as defined in CDMA 2000 standard, using 2X data rate, and operating on convolutionally encoded data. The OLPC is configured for a target FER of 0.167. As can be seen from FIG. 4, a smaller threshold value N results in a higher FER and a larger threshold value N, such as a value of 10, results in an FER that is closer to the target FER. An even higher threshold value, N, may result in an even lower FER but at a cost of reduced forward link capacity.

FIG. 5 shows a graph of FER for varying values of margin value, D, where the OLPC, link parameters, and MS are all configured the same as they were for FIG. 4. As can be seen from the figure, the FER increases for lower margin values and approaches the target FER for a margin value above three. However, the higher the margin value, D, the more the OLPC operates as an uncompensated loop, resulting in potentially reduced link capacity. The value of D=2 provides a tradeoff of FER while still maintaining an OLPC setpoint that allows a higher capacity than an uncompensated OLPC setpoint. The value of 2 dB is not an exact figure. Other values for D may be substantially equal to 2 dB depending on the sensitivity of the OLPC to the setpoint value and the ability of an implementing hardware to represent the number in memory.

Table 1 shows the performance of various MS configurations using the Forward OLPC algorithm. Each of the MS is configured to operate in radio configuration 3 as defined in the CDMA 2000 standard and each MS is configured to have a target FER of 0.167. The MS differ in that the data rate varies from 2X to 16X (where the value X represents 9600 bps) and the data is either convolutionally encoded or turbo coded. The value of N wass set to ten Erasures and the predetermined margin was set to two.

TABLE 1

| Data Rate | Target FER | Actual FER |
|---|---|---|
| RC3, 16X, Convolutional code | 16.7% | 20.9% |
| RC3, 2X, Turbo code | 16.7% | 17.0% |
| RC3, 16X, Turbo code | 16.7% | 19.5% |

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile station, base station, or base station controller. In the alternative, the processor and the storage medium may reside as discrete components in a mobile station, base station, or base station controller.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. In a communication device having discontinuous transmission (DTX) detection, a method of providing outer loop power control comprising:
   estimating a number of erroneous frame detections; and
   adjusting a power control setpoint associated with the outer loop power control wherein the adjustment is determined at least in part by the estimated number of erroneous frame detections.

2. The method of claim 1, wherein the erroneous frame detections are Erasure detections.

3. The method of claim 1, further comprising detecting a Good frame and wherein adjusting the power control setpoint occurs in response to detecting the Good frame.

4. The method of claim 3, wherein the number of erroneous frame detections is a number of Erasure detections occurring between successive Good frame detections.

5. The method of claim 4, wherein the adjustment to the power control setpoint is zero if the number of Erasure detections is less than a predetermined threshold.

6. The method of claim 5, wherein the predetermined threshold is a constant.

7. The method of claim 5, wherein the predetermined threshold is 10.

8. The method of claim 1, wherein adjusting the power control setpoint comprises:
   setting the power control setpoint to the maximum of a predetermined minimum setpoint value and a current setpoint value, if the number of erroneous frame detections equals or exceeds a predetermined threshold; and
   setting the power control setpoint to the current setpoint value, if the number of erroneous frame detections is less than the predetermined threshold value.

9. The method of claim 1, wherein the outer loop power control is reverse outer loop power control.

10. The method of claim 1, wherein the outer loop power control is forward outer loop power control.

11. The method of claim 1, wherein the communication device is one of a CDMA base station, a CDMA base station controller, and a CDMA mobile station.

12. In a communication device having discontinuous transmission (DTX) detection, a method of providing outer loop power control comprising:
   estimating a number of erroneous frame detections;
   adjusting a power control setpoint associated with the outer loop power control wherein the adjustment is determined at least in part by the estimated number of erroneous frame detections; and
   detecting a Good frame
   wherein adjusting the power control setpoint occurs in response to detecting the Good frame and wherein the power control setpoint is adjusted to equal the minimum of
   a historic setpoint, and
   a Signal to Noise Ratio (SNR) plus a predetermined margin.

13. The method of claim 12, wherein the SNR is a measure value.

14. The method of claim 12, wherein the SNR is a $E_b/N_t$ value of the detected Good frame.

15. The method of claim 12, wherein the current setpoint and SNR are in units of dB and the predetermined margin is substantially 2 dB.

16. In a communication device having discontinuous transmission (DTX) detection, a method of providing outer loop power control comprising:
   estimating a number of erroneous Erasure detections;
   detecting a Good frame; and
   in response to detecting the Good frame indication, adjusting a power control setpoint associated with the outer loop power control wherein the adjustment comprises:
   detecting a frame sequence number in the detected Good frame; and
   setting the setpoint to a dynamically determined setpoint backoff value determined in part on the estimated number of Erasure detections if the frame sequence number is not continuous with a prior frame sequence number.

17. A wireless communication device having discontinuous transmission (DTX) detection and outer loop power control comprising:
   means for estimating a number of erroneous frame detections; and
   means for adjusting a power control setpoint associated with the outer loop power control wherein the adjustment is determined at least in part by the number of erroneous frame detections.

18. The device of claim 17, wherein the erroneous frame detections are Erasure detections.

19. The device of claim 17, further comprising means for detecting a Good frame and wherein the means for adjusting the power control setpoint responds to the means for detecting the Good frame.

20. The device of claim 19, wherein the means for estimating the number of erroneous frame detections counts a number of Erasure detections occurring between successive Good frame detections.

21. The device of claim 20, wherein the adjustment to the power control setpoint is zero if the number of Erasure detections is less than a predetermined threshold.

22. The device of claim 21, wherein the predetermined threshold is a constant.

23. The device of claim 21, wherein the predetermined threshold is 10.

24. The device of claim 17, wherein the means for adjusting the power control setpoint comprises:

means for setting the power control setpoint to the maximum of a predetermined minimum setpoint value and a current setpoint value if the number of erroneous frame detections equals or exceeds a predetermined threshold; and means for setting the power control setpoint to the current setpoint value if the number of erroneous frame detections is less than the predetermined threshold value.

25. The device of claim 17, wherein the outer loop power control is reverse outer loop power control.

26. The device of claim 17, wherein the outer loop power control is forward outer loop power control.

27. The device of claim 17, wherein the wireless communication device is one of a CDMA base station, a CDMA base station controller, and a CDMA mobile station.

28. A wireless communication device having discontinuous transmission (DTX) detection and outer loop power control comprising:

means for estimating a number of erroneous frame detections;

means for adjusting a power control setpoint associated with the outer loop power control wherein the adjustment is determined at least in part by the number of erroneous frame detections; and means for detecting a Good frame and wherein the means for adjusting the power control setpoint responds to the means for detecting the Good frame, wherein the means for adjusting the power control setpoint adjusts the power control setpoint to equal the minimum of a historic setpoint, and a Signal to Noise Ratio (SNR) plus a predetermined margin.

29. The device of claim 24, wherein the SNR is a measured value.

30. The device of claim 24, wherein the SNR is a $E_b/N_t$ value of the detected good frame.

31. The device of claim 24, wherein the current setpoint and SNR are in units of dB and the predetermined margin is substantially 2 dB.

* * * * *